US007180881B2

(12) United States Patent
DiFazio

(10) Patent No.: US 7,180,881 B2
(45) Date of Patent: Feb. 20, 2007

(54) BURST DETECTOR

(75) Inventor: Robert A. DiFazio, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1084 days.

(21) Appl. No.: 10/196,857

(22) Filed: Jul. 16, 2002

(65) Prior Publication Data

US 2003/0063576 A1 Apr. 3, 2003

Related U.S. Application Data

(60) Provisional application No. 60/325,692, filed on Sep. 28, 2001.

(51) Int. Cl.
*H04B 7/216* (2006.01)

(52) U.S. Cl. ...................................... 370/335; 375/152

(58) Field of Classification Search ..................... None
See application file for complete search history.

(56) References Cited

U.S. PATENT DOCUMENTS

| | | | | |
|---|---|---|---|---|
| 5,579,319 | A | 11/1996 | Daniel | |
| 5,666,358 | A | 9/1997 | Paratore et al. | |
| 5,724,657 | A | 3/1998 | Lin et al. | |
| 6,154,659 | A | 11/2000 | Jalali et al. | |
| 6,285,681 | B1 | 9/2001 | Kolze et al. | |
| 6,349,207 | B1 * | 2/2002 | Monot et al. | 455/423 |
| 6,393,276 | B1 | 5/2002 | Vanghi | |
| 6,480,481 | B1 | 11/2002 | Park et al. | |
| 6,628,707 | B2 * | 9/2003 | Rafie et al. | 375/233 |

FOREIGN PATENT DOCUMENTS

| | | |
|---|---|---|
| EP | 0 665 530 | 8/1995 |
| JP | 2000-165294 | 6/2000 |
| JP | 2000-508128 | 6/2000 |
| JP | 2001-217812 | 8/2001 |

(Continued)

OTHER PUBLICATIONS

Tozer et al, Detectionof Preamble of Random Access Burst in W-CDMA System, IEEE, pp. 82-86, 2000.*

(Continued)

*Primary Examiner*—Frank Duong
(74) *Attorney, Agent, or Firm*—Volpe and Koenig, P.C.

(57) ABSTRACT

The present invention is a receiver for receiving a communication signal divided into a plurality of timeslots, wherein the timeslots include a plurality of channels, including a burst detector for detecting when a selected one of the plurality of channels of the communication is received. The burst detector comprises a noise estimation device for determining a scaled noise power estimate of the selected one of the timeslots, a matched filter for detecting signal power of the selected one of the timeslots and a signal power estimation device, responsive for the matched filter, for generating a signal power estimate of the, selected one of the timeslots. A comparator responsive to the scaled noise power estimate the signal power estimate is also included in the burst detector for generating a burst detection signal when the signal power estimate is greater than the scaled noise power estimate, and a data estimation device, responsive to the burst detection signal, for decoding the plurality of channels.

29 Claims, 9 Drawing Sheets

FOREIGN PATENT DOCUMENTS

JP 2001-217895 8/2001

OTHER PUBLICATIONS

Xue et al, Multiuser Detection Techniques: An Overview, Ericsson Research, pp. 1-20, 1998.*

"Universal Mobile Telecommunications Systems (UMTS); Physical Layer Procedure (TDD) (3GPP TS 25.224 version 4.1.0 Release 4)"; ETSI TS 125 224 V4.1.0, Jun. 2001.

3GPP TS 25.224 v4.1.0 (Jun. 2001) "3rd Generation Partnership Project; Technical Specification Group Radio Access Network; Physical Layer Procedures (TDD) (Release 4)" Jun. 2001.

* cited by examiner

BURST DETECTOR

CROSS REFERENCE TO RELATED APPLICATIONS

The application claims priority from Provisional Patent Application No. 60/325,692, filed Sep. 28, 2001.

BACKGROUND

The present invention relates to the field of wireless communications. More specifically, the present invention relates to detecting codes in a communication signal in order to activate the receiver to process the signal.

Spread spectrum TDD systems carry multiple communications over the same spectrum. The multiple signals are distinguished by their respective chip code sequences (codes). Referring to FIG. 1, TDD systems use repeating transmission time intervals (TTIs), which are divided into frames 34, further divided into a number of timeslots 37$_1$–37$_n$, such as fifteen timeslots. In such systems, a communication is sent in a selected timeslot out of the plurality of timeslots 37$_1$–37$_n$ using selected codes. Accordingly, one frame 34 is capable of carrying multiple communications distinguished by both timeslot and code. The combination of a single code in a single timeslot is referred to as a physical channel. A coded composite transport channel (CCTrCh) is mapped into a collection of physical channels, which comprise the combined units of data, known as resource units (RUs), for transmission over the radio interface to and from the user equipment (UE) or base station. Based on the bandwidth required to support such a communication, one or multiple CCTrChs are assigned to that communication.

The allocated set of physical channels for each CCTrCh holds the maximum number of RUs that would need to be transmitted during a TTI. The actual number of physical channels that are transmitted during a TTI are signaled to the receiver via the Transport Format Combination Index (TFCI). During normal operation, the first timeslot allocated to a CCTrCh will contain the required physical channels to transmit the RUs and the TFCI. After the receiver demodulates and decodes the TFCI it would know how many RUs are transmitted in a TTI, including those in the first timeslot. The TFCI conveys information about the number of RUs.

FIG. 1 also illustrates a single CCTrCh in a TTI. Frames 1, 2, 9 and 10 show normal CCTrCh transmission, wherein each row of the CCTrCh is a physical channel comprising the RUs and one row in each CCTrCh contains the TFCI. Frames 3–8 represent frames in which no data is being transmitted in the CCTrCh, indicating that the CCTrCh is in the discontinuous transmission state (DTX). Although only one CCTrCh is illustrated in FIG. 1, in general there can be multiple CCTrChs in each slot, directed towards one or more receivers, that can be independently switched in and out of DTX.

DTX can be classified into two categories: 1) partial DTX; and 2) full DTX. During partial DTX, a CCTrCh is active but less than the maximum number of RUs are filled with data and some physical channels are not transmitted. The first timeslot allocated to the CCTrCh will contain at least one physical channel to transmit one RU and the TFCI word, where the TFCI word signals that less than the maximum number of physical channels allocated for the transmission, but greater than zero (0), have been transmitted.

During full DTX, no data is provided to a CCTrCh and therefore, there are no RUs at all to transmit. Special bursts are periodically transmitted during full DTX and identified by a zero (0) valued TFCI in the first physical channel of the first timeslot allocated to the CCTrCh. The first special burst received in a CCTrCh after a normal CCTrCh transmission or a CCTrCh in the partial DTX state indicates the start of full DTX. Subsequent special bursts are transmitted every Special Burst Scheduling Parameter (SBSP) frames, wherein the SBSP is a predetermined interval. Frames 3 and 7 illustrate the CCTrCh comprising this special burst. Frames 4–6 and 8 illustrate frames between special bursts for a CCTrCh in full DTX.

As shown in Frame 9 of FIG. 1, transmission of one or more RUs can resume at any time, not just at the anticipated arrival time of a special burst. Since DTX can end at any time within a TTI, the receiver must process the CCTrCh in each frame, even those frames comprising the CCTrCh with no data transmitted, as illustrated by Frames 4–6 and 8. This requires that the receiver operate at high power in order to process the CCTrCh for each frame, regardless of its state.

Receivers are able to utilize the receipt of subsequent special bursts to indicate that the CCTrCh is still in the full DTX state. Detection of the special burst, though, does not provide any information as to whether the CCTrCh will be in the partial DTX state or normal transmission state during the next frame.

Support for DTX has implications to several receiver functions, notably code detection. If no codes are sent in the particular CCTrCh in one of its frames, the code detector may declare that multiple codes are present, resulting in a Multi-User Detector (MUD) executing and including codes that were not transmitted, reducing the performance of other CCTrChs that are also processed with the MUD. Reliable detection of full DTX will prevent the declaring of the presence of codes when a CCTrCh is inactive. Also, full DTX detection can result in reduced power dissipation that can be realized by processing only those codes that have been transmitted and not processing empty timeslots.

Accordingly, there exists a need for an improved receiver.

SUMMARY

The present invention is a receiver for receiving a communication signal divided into a plurality of timeslots, wherein the timeslots include a plurality of channels, including a burst detector for detecting when a selected one of the plurality of channels of the communication is received. The burst detector comprises a noise estimation device for determining a scaled noise power estimate of the selected one of the timeslots, a matched filter for detecting signal power of the selected one of the channels of the timeslots and a signal power estimation device, responsive to the matched filter, for generating a signal power estimate of the selected one of the channels of the timeslots. A comparator, responsive to the scaled noise power estimate and the signal power estimate, for generating a burst detection signal when the signal power estimate is greater than the scaled noise power estimate, and a data estimation device, responsive to the burst detection signal, for decoding the plurality of channels are also included in the burst detector.

BRIEF DESCRIPTION OF THE DRAWING(S)

DETAILED DESCRIPTION OF THE PREFERRED EMBODIMENT(S)

Figure 1:
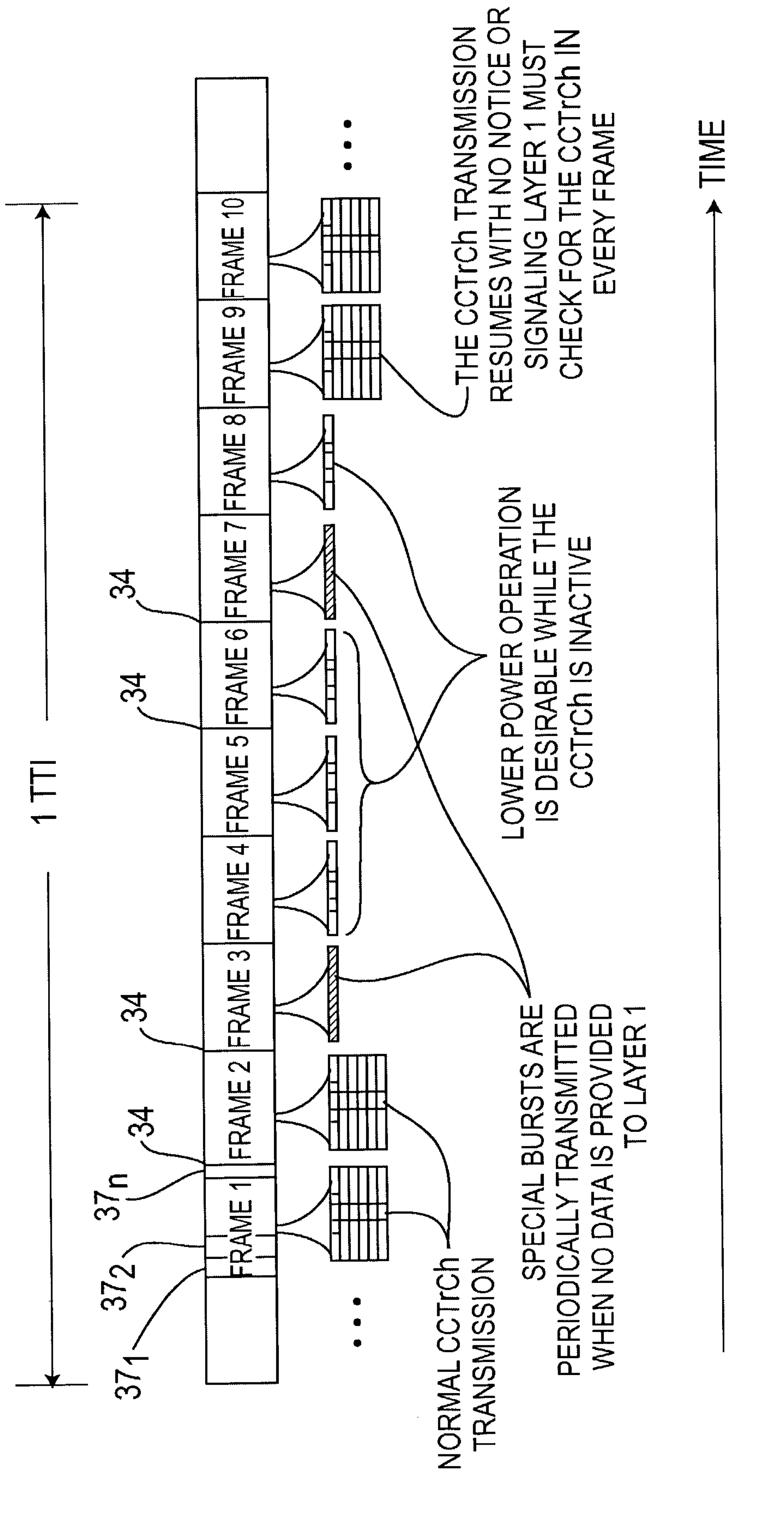
FIG. 1 illustrates an exemplary repeating transmission time interval (TTI) of a TDD system and a CCTrCh.

The preferred embodiments will be described with reference to the drawing figures where like numerals represent like elements throughout.

Figure 2:
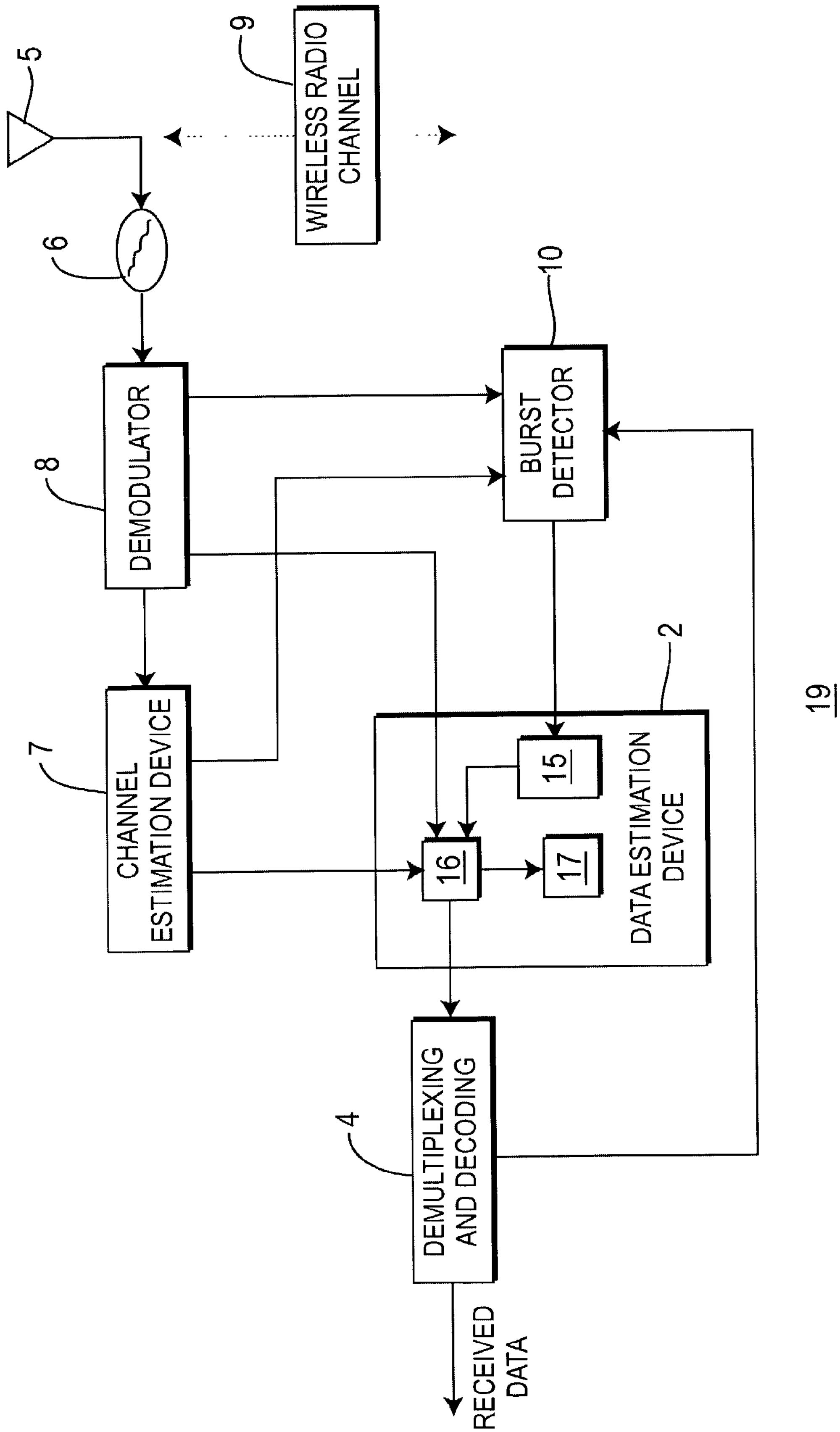
FIG. 2 is a block diagram of a receiver in accordance with the preferred embodiment of the present invention.

Referring to FIG. 2, a receiver, preferably at a user equipment (UE) 19, mobile or fixed, comprises an antenna 5, an isolator or switch 6, a demodulator 8, a channel estimation device 7, a data estimation device 2, a burst detector 10, and demultiplexing and decoding device 4. Although the receiver will be disclosed at a UE, the receiver may also be located at a base station.

The receiver 19 receives various radio frequency (RF) signals including communications over the wireless radio channel using the antenna 5, or alternatively an antenna array. The received signals are passed through a transmit/receive (T/R) switch 6 to a demodulator 8 to produce a baseband signal. The baseband signal is processed, such as by the channel estimation device 7 and the data estimation device 2, in the timeslots and with the appropriate codes assigned to the receiver 19. The channel estimation device 7 commonly uses the training sequence component in the baseband signal to provide channel information, such as channel impulse responses. The channel information is used by the data estimation device 2 and the burst detector 10. The data estimation device 2 recovers data from the channel by estimating soft symbols using the channel information. FIG. 2 shows one burst detector, however, a receiver may have multiple burst detectors to detect the reception of more than one code. Multiple burst detectors would be used, for example, when multiple CCTrChs are directed towards one receiver.

Figure 3:
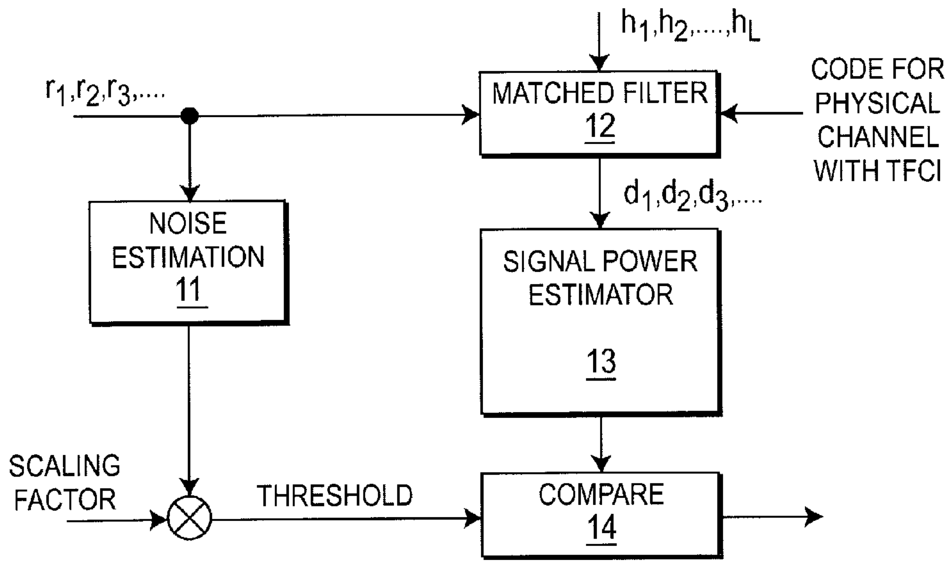
FIG. 3 is a block diagram of the burst detector in accordance with the preferred embodiment of the present invention.

FIG. 3 is a block diagram of the burst detector 10 in accordance with the preferred embodiment of the present invention. The burst detector 10 comprises a noise estimator 11, a matched filter 12, a signal power estimator 13, and a comparator 14. The received and demodulated communication is forwarded to the matched filter 12 and the noise estimator 11. The noise estimator 11 estimates the noise power of the received signal. The noise power estimate may use a predetermined statistic, such as the root-mean square value of the input samples, or other methods to approximate noise, interference, or total power. The noise power estimate is scaled by a predetermined scaling factor, generating a threshold value, which is forwarded to the comparator 14.

The received and demodulated communication is also forwarded to the matched filter 12, as well as, the channel impulse response from the channel estimation device 7. The matched filter 12 is coupled to a signal power estimator 13 and a channel estimation device 7. Although a matched filter 12 is shown in FIG. 3 and described herein, any device which demodulates a particular code in the received signal can be utilized, such as a rake receiver 19. The matched filter 12 also receives the code for the physical channel carrying the TFCI for the particular CCTrCh. Utilizing the three inputs, the matched filter 12 computes soft bit or symbol decisions for the physical channel carrying the TFCI for the CCTrCh. The soft decisions are then forwarded to the signal power estimator 13.

The signal power estimator 13, coupled to the matched filter 12 and the comparator 14, receives the output of the matched filter 12 and estimates the signal power of the soft decisions in the received communication. As those skilled in the art know, a method of estimating the signal power is to separate the real and imaginary parts of the outputs of matched filter 12 and calculate the power therefrom. Any method of signal power estimation, though, may be used by the signal power estimator 13. Once the signal power estimator 13 determines the signal power of the soft decisions in the received communication, it is forwarded to the comparator 14.

The comparator 14 is coupled at its inputs to the signal power estimator 13 and the noise power estimator 11, and at its output to the data estimation device 2. The comparator 14 compares the scaled noise power and the signal power and the result of the comparison is used to indicate whether the particular CCTrCh is still in full DTX. For purposes of this disclosure, DTX will be indicative of the full DTX state discussed hereinabove. If the scaled estimated noise power is greater than the estimated signal power for the particular code carrying the TFCI in the first timeslot allocated to the CCTrCh in a frame, the comparator 14 outputs a signal to the data estimation device 2 indicating that no data was sent for the particular CCTrCh. This results is in the data estimation device 2 not operating to demodulate the particular CCTrCh.

If the estimated signal power for the particular code carrying the TFCI in the first timeslot allocated to the CCTrCh in a frame is greater than the scaled estimated noise power, the comparator 14 outputs a signal, to the data estimation device 2 indicating that the end of DTX has been detected, which results in the data estimation device activating the CCTrCh.

In the description above, the comparison between the scaled noise power and the estimated signal power is limited to the particular code carrying the TFCI since if any codes are transmitted then the code carrying the TFCI will be among them. As those skilled in the art know, the comparison can use other received codes allocated to the CCTrCh. If the estimated signal power is greater than the scaled noise power for any particular code, the comparator 14 outputs a signal to the data estimation device 2. The data estimation device 2 can then activate demodulation of the code. Alternatively, it can be activated to demodulate the CCTrCh.

The data estimation device 2, coupled to the demodulator 8, burst detector 10, the channel estimation device 7, and the data demultiplexing and decoding device 4, comprises a code detection device (CDD) 15, a MUD 16, and a TFCI decoder 17. The MUD 16 decodes the received data using the channel impulse responses from the channel estimation device 7 and a set of channelization codes, spreading codes, and channel offsets from the CDD. As those skilled in the art know, the MUD 16 may utilize any multi-user detection method to estimate the data symbols of the received communication, a minimum mean square error block linear equalizer (MMSE-BLE), a zero-forcing block linear equalizer (ZF-BLE) or the use of a plurality of joint detectors, each for detecting one of the plurality of receivable CCTrChs associated with the UE 19.

The CDD 15, coupled to the MUD 16 and the burst detector 10, provides the MUD 16 with the set of codes for each of the plurality of received CCTrChs associated with the receiver 19. If the burst detector 10 indicates that the end of DTX state has been detected, the CDD 15 generates the code information and forwards it to the MUD 16 for decoding of the data. Otherwise, the CDD 15 does nothing with the particular CCTrCh.

Once the MUD 16 has decoded the received data, the data is forwarded to the TFCI decoder 17 and the data demultiplexing and decoding device 4. As those skilled in the art know, the TFCI decoder 17 outputs the maximum-likelihood set of TFCI information bits given the received information. When the value of the TFCI decoder 17 is equal to zero (0), a special burst has been detected, indicating the CCTrCh is beginning DTX or remains in the DTX state.

As stated above, the data estimation device 2 forwards the estimated data to the data demultiplexing and decoding device 4. The demultiplexing and decoding device 4, coupled to the data estimation device 2, detects the received signal to interference ratio (SIR) of the particular CCTrCh or the code carrying the TFCI in the CCTrCh. If the value of the SIR is greater than a predetermined threshold, the end of DTX detected by the burst detector 10 is validated. If the SIR is below the threshold, then a false detection has occurred, indicating that the particular CCTrCh is still in the DTX state. The data demultiplexing and decoding may include error detection on the data which acts as a sanity check for the burst detector 10, reducing the effect of false detections by the UE receiver 19.

Figure 4B:
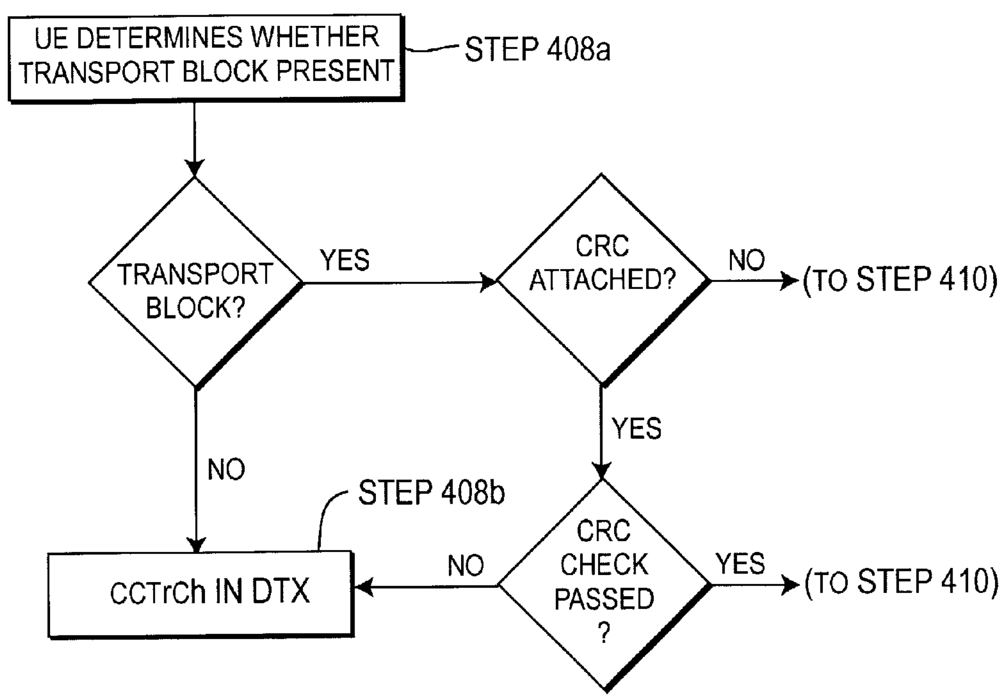
FIGS. 4A and 4B are a flow diagram of the operation of the receiver in activating and deactivating the burst detector of the present invention.
Figure 4A:
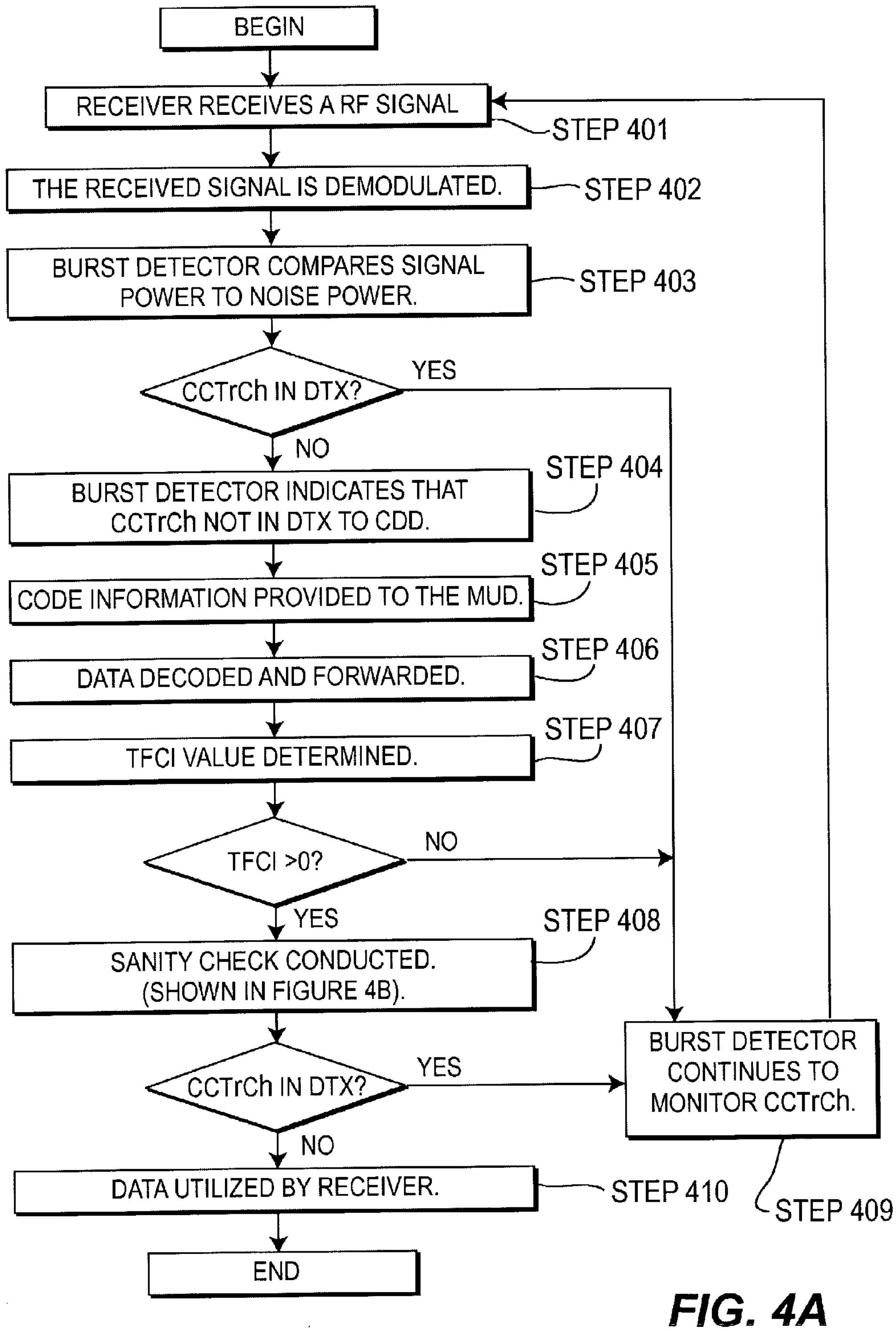

The flow diagram of the operation of the receiver in accordance with the preferred embodiment of the present invention are illustrated in FIGS. 4A and 4B. After synchronization of the UE to a base station and assuming the previous received frame included a special burst, the UE receiver 19 receives a plurality of communications in a RF signal (Step 401) and demodulates the received signal, producing a baseband signal (Step 402). For each of the CCTrChs associated with the UE, the burst detector 10 determines whether there are any symbols within a particular CCTrCh by comparing the estimated noise power to the estimated signal power (Step 403).

If the burst detector 10 indicates to the CDD 15 that the CCTrCh is in the DTX state, the burst detector 10 continues to monitor the CCTrCh (Step 409). Otherwise, the burst detector indicates to the CDD 15 that the CCTrCh is not in the DTX state (Step 404). The CDD 15 then provides the MUD 16 with the code information for the particular CCTrChs associated with the UE (Step 405). The MUD 16 processes the received CCTrCh and forwards the data symbols to the TFCI decoder 17 and the data demultiplexing and decoding device 4 (Step 406). The TFCI decoder 17 processes the received data symbols to determine the TFCI value (Step 407). If the TFCI value is zero (0), the special burst has been detected and a signal is then sent to the burst detector 10 to continue to monitor the CCTrCh (Step 409), indicating that the CCTrCh is in, or still in, the full DTX state.

If the TFCI value is greater than zero (0), and a CCTrCh is currently in the full DTX state, then the UE performs a sanity check on the received data using information provided by the data demultiplexing and decoding device 4 (Step 408). Referring to FIG. 4B, when conducting the sanity check the UE first determines whether at least one transport block has been received in the associated CCTrCh (Step 408*a*). If there are no transport blocks received, the UE remains in full DTX (Step 408*b*). If there is at least one transport block, the data demultiplexing and decoding device 4 determines whether at least one of the detected transport blocks has a CRC attached. If not, then the data in the CCTrCh is accepted as valid and utilized by the UE (Step 410). If there is a CRC attached, then the data demultiplexing and decoding device 4 determines whether at least one transport block has passed the CRC check. If at least one has passed, then the data in the CCTrCh is accepted as valid and utilized by the UE (Step 410). Otherwise, the UE determines that the particular CCTrCh remains in the full DTX state (Step 408*b*).

If the sanity check determines that a CCTrCh is in the full DTX state, then an output signal is sent to the burst detector 10 indicating that the burst detector 10 should continue to monitor the CCTrCh to determine when full DTX ends and supply an output to the code detection device 15. If the DTX control logic determines that a CCTrCh is not in the full DTX state then it outputs a signal to the burst detector 10 indicating that it should not monitor the CCTrCh and the decoded data is utilized by the UEs (Step 410).

Figure 5:
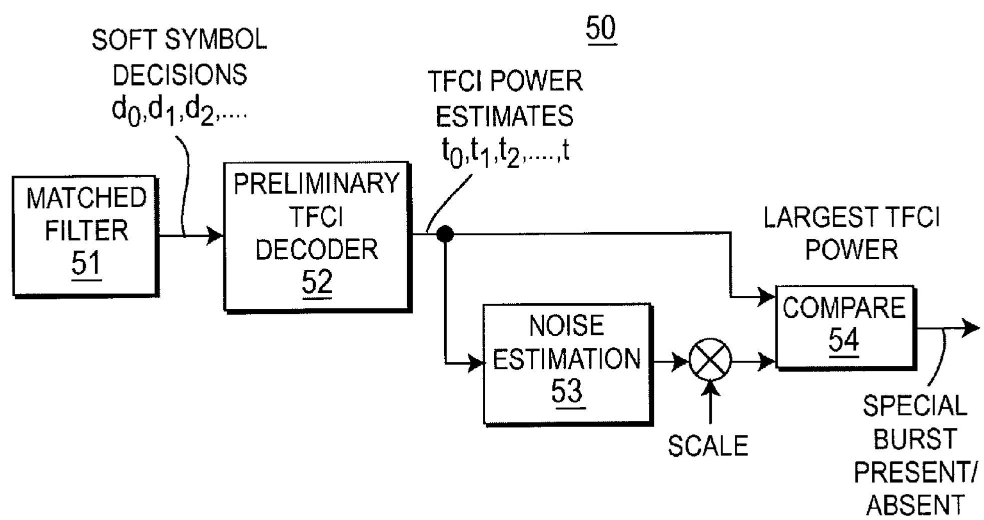
FIG. 5 is a block diagram of a first alternative embodiment of the burst detector of the present invention.

An alternative embodiment of the burst detector 50 of the present invention is illustrated in FIG. 5. This alternative detector 50 comprises a matched filter 51, a preliminary TFCI decoder 52, a noise estimator 53, and a comparator 54. This detector 50 operates similar to the detector 10 disclosed in the preferred embodiment. The matched filter 51 receives the demodulated received signal from the demodulator 8 and forwards the soft symbol decisions to the preliminary TFCI decoder 52. Similar to the TFCI decoder 17 disclosed hereinabove, the preliminary TFCI decoder 52, coupled to the comparator 54 and the noise estimator 53, computes power estimates for each possible TFCI word. The largest TFCI power estimate is then forwarded to the comparator 54 and all power estimates are forwarded to the noise estimator 53.

The noise estimator 53, coupled to the TFCI decoder 52, and the comparator 54, receives the decoded TFCI power and the largest TFCI power and calculates a predetermined statistic, such as the root-mean-square of all inputs. The statistic provides an estimate of the noise that the TFCI decoder 52 is subject to. The noise estimate is scaled and forwarded to the comparator 54 for comparison to the largest TFCI power from the TFCI decoder 52.

The comparator 54, coupled to the TFCI decoder 52 and the noise estimator 53, receives the largest TFCI power and the scaled noise estimate and determines the greater of the two values. Similar to the preferred embodiment, if the estimated TFCI power is greater than the scaled noise estimate, the burst detector 50 signals to the data estimation device 2, which activates the CCTrCh demodulation of the particular CCTrCh associated with the UE. Otherwise, the burst detector 50 signals to the data estimation device 2 that the CCTrCh remains in the DTX state.

Figure 6:
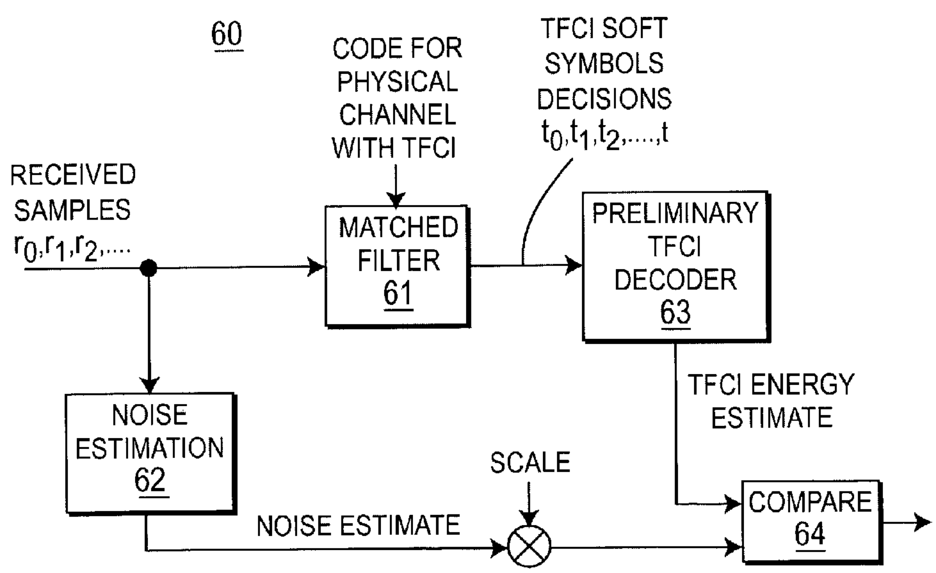
FIG. 6 is a second alternative embodiment of the burst detector of the present invention.

A second alternative embodiment of the burst detector is illustrated in FIG. 6. Similar to the detector 50 illustrated in FIG. 5 and disclosed above, this alternative burst detector 60 comprises a matched filter 61, a preliminary TFCI decoder 63, a noise estimator 62, and a comparator 64. The difference between this embodiment and the previous embodiment is that the noise estimator 62 receives the demodulated received signal before the matched filter 61 determines the soft symbols. The noise estimator 62, coupled to the demodulator 8 and the comparator 64, receives the demodulated received signal and calculates a noise estimate as in the preferred embodiment 11 shown in FIG. 3. The calculated statistic is then the noise estimate of the received signal.

The operation of this second alternative is the same as the previous alternative. The matched filter 61 receives the demodulated received signal, determines the soft symbols of the CCTrCh using the first code for the particular CCTrCh and forwards the soft symbols to the TFCI decoder 63. The TFCI decoder 63 decodes the received soft symbols to produce a decoded TFCI word. An estimate of the power of the decoded TFCI word is then generated by the decoder and forwarded to the comparator 64. The comparator 64 receives the power estimate for the decoded TFCI word and a scaled noise estimate from the noise estimator 62 and determines which of the two values is greater. Again, if the estimated power of the TFCI word is greater than the scaled noise estimate, the burst detector 60 signals to the data estimation device 2 that data has been transmitted in the particular CCTrCh associated with the receiver 19, indicative of the end of DTX state or the transmission of the special burst.

Figure 7:
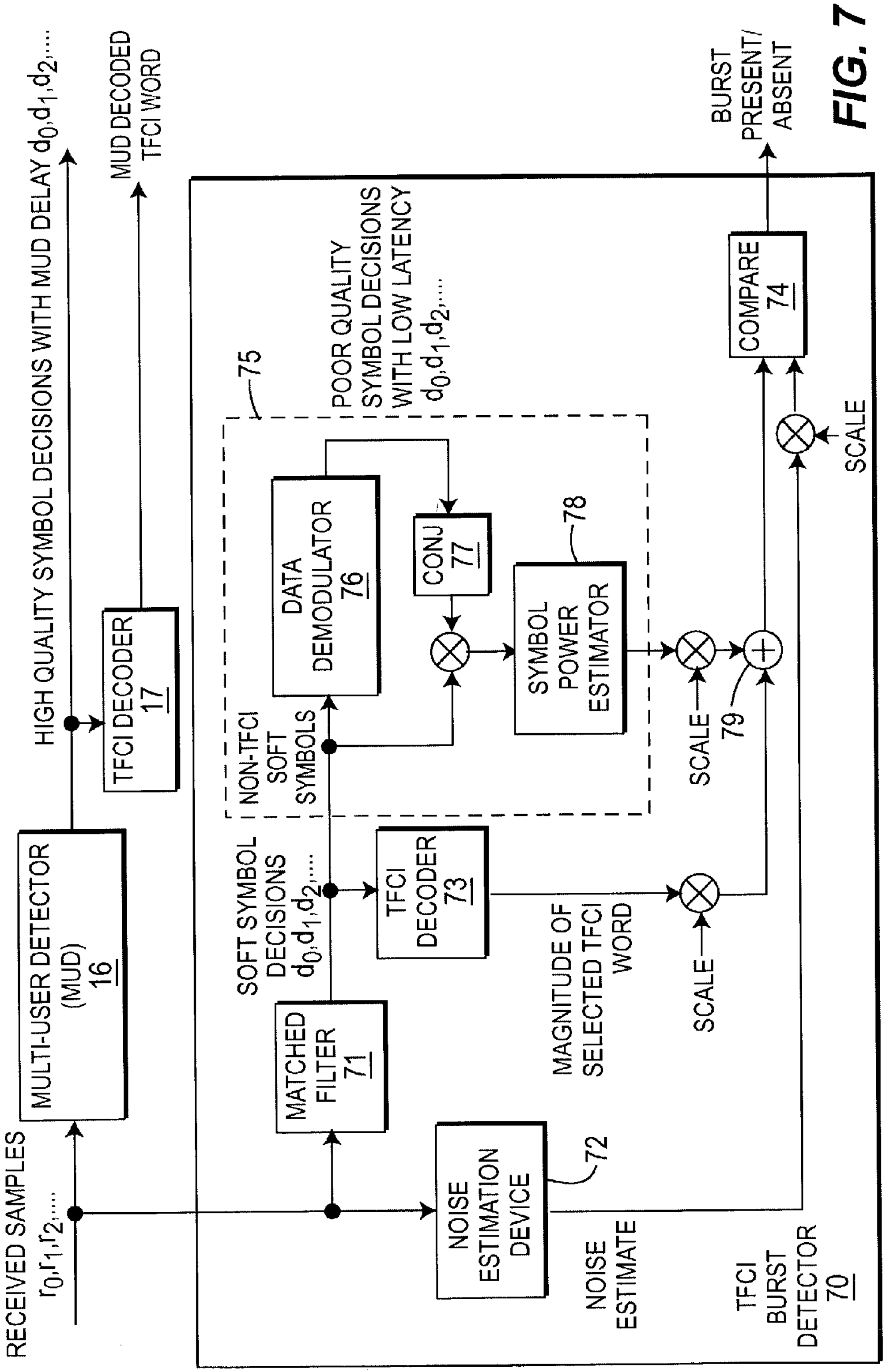
FIG. 7 is a third alternative embodiment of the burst detector of the present invention.

A third alternative embodiment of the burst detector is illustrated in FIG. 7. As shown, this alternative detector 70 is the same as the second alternative except that an additional Decision Feedback Accumulation loop 75 is added. This loop 75 is coupled to the matched filter 71 and an adder 79 and comprises a data demodulator 76, a conjugator 77, and a symbol power estimator 78. The soft symbols output from the matched filter 71 are forwarded to the demodulator 76 of the loop 75, which generates symbol decisions with low latency. Each of the low latency symbol decisions are conjugated by the conjugator 77 and combined with the soft symbols output by the matched filter 71. The combined symbols are then forwarded to the symbol power estimator 78 where a power estimate of the combined symbols is generated and scaled by a predetermined factor and forwarded to the adder 79.

The adder 79, coupled to the symbol power estimator 78, the TFCI decoder 73 and the comparator 74, adds a scaled TFCI power estimate from the TFCI decoder 73 and the scaled symbol power estimate from the symbol power estimator 78, then forwards the summed power estimate to the comparator 74 for comparison to the noise estimate. A determination is then made as to whether data has been transmitted in the CCTrCh. This third alternative embodiment improves the performance of the burst detector 70 with a TFCI detector in those cases where the power estimate of the TFCI word is too low for a reliable determination of the state of the CCTrCh.

Figure 8:
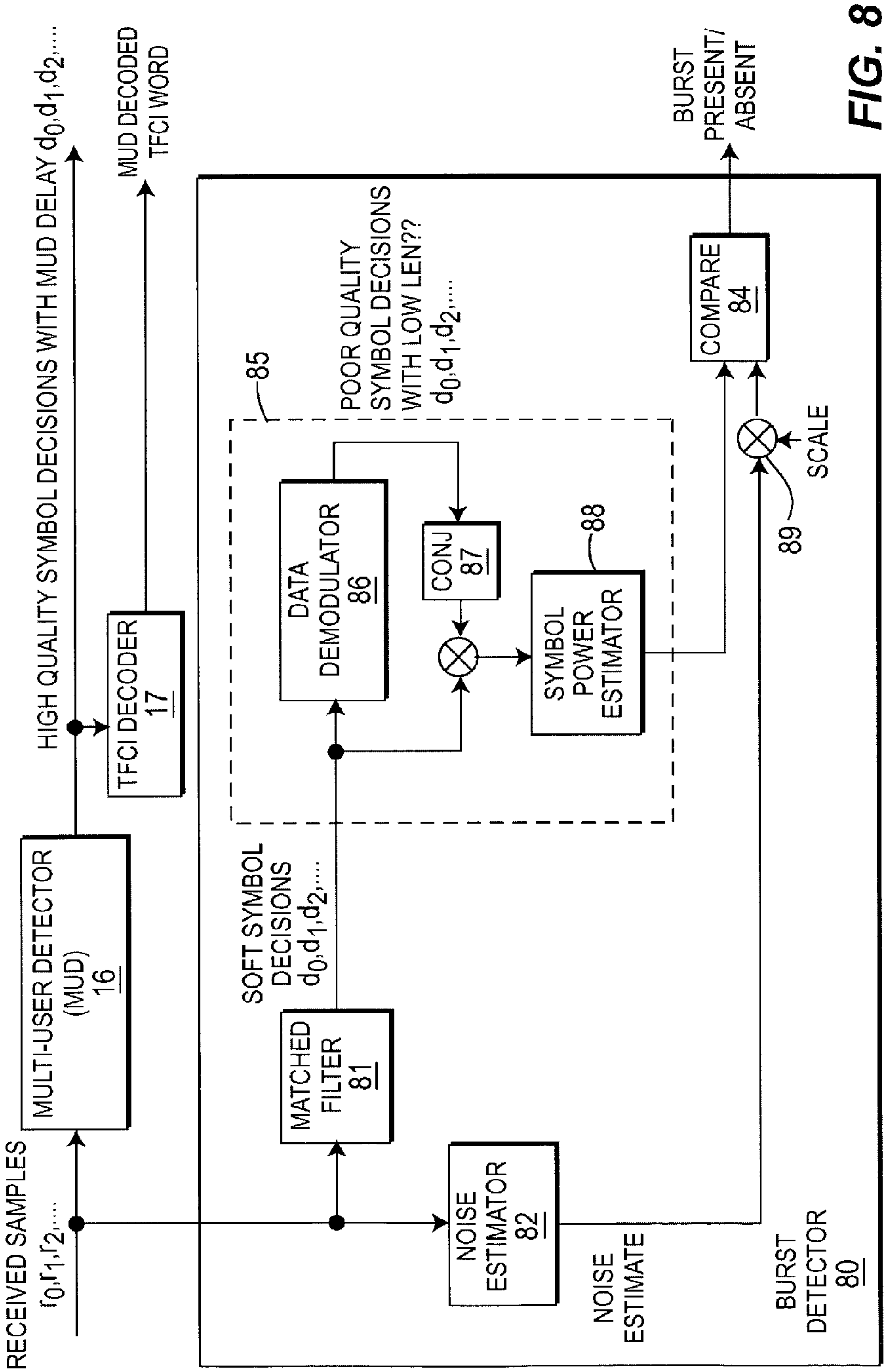
FIG. 8 is a fourth alternative embodiment of the burst detector of the present invention.

A fourth alternative embodiment of the burst detector of the present invention is illustrated in FIG. 8. This alternative detector 80 eliminates the TFCI decoder 73 of the alternative illustrated in FIG. 7. The advantage of eliminating the TFCI decoder 73 is that the burst detector 80 requires less signal processing. The comparator 84 for this alternative, then, compares the noise estimate to the symbol power estimate to determine whether the particular CCTrCh associated with the UE comprises data.

Figure 9:
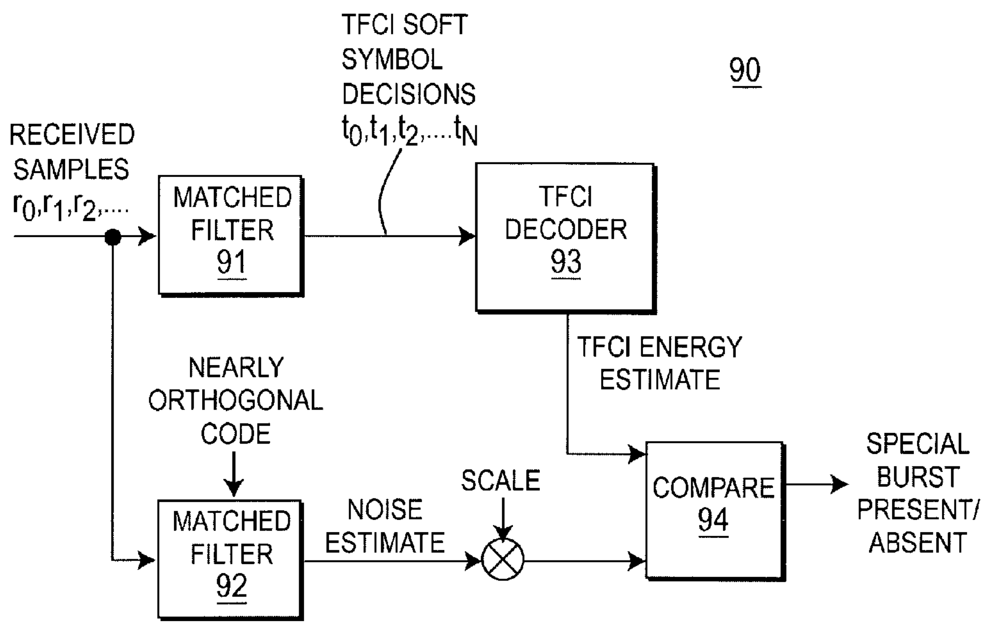
FIG. 9 is a fifth alternative embodiment of the burst detector of the present invention.

A fifth alternative embodiment of the burst detector of the present invention is illustrated in FIG. 9. This alternative burst detector 90 comprises a first and second matched filter 91, 92, a TFCI decoder 93 and a comparator 94. As shown in FIG. 9, the burst detector 90 is similar to the alternative detector 60 illustrated in FIG. 6. The TFCI decoder 93 generates an energy estimate of the decoded TFCI word from the soft symbols output by the first matched filter 91. This energy estimate is forwarded to the comparator 94 for comparison to a scaled noise estimate. The noise estimate in this alternative burst detector 90 is generated by the second matched filter 92.

The second matched filter 92, coupled to the demodulator 8 and the comparator 94, receives the demodulated received signal and generates a noise estimate using a 'nearly' orthogonal code. The 'nearly' orthogonal codes are determined by selecting codes that have low cross correlation with the subset of orthogonal codes used in a particular timeslot where the associated CCTrCh is located. For those systems that do not use all of their orthogonal codes in a timeslot, the 'nearly' orthogonal code could be one of the unused orthogonal codes. For example, in a 3GPP TDD or TD-SCDMA system there are 16 OVSF codes. If less than all 16 OVSF codes are used in a timeslot, then the 'nearly' orthogonal code would equal one of the unused OVSF codes. The noise estimate generated by the second matched filter 92 is scaled by a predetermined factor and forwarded to the comparator 94.

Figure 10:
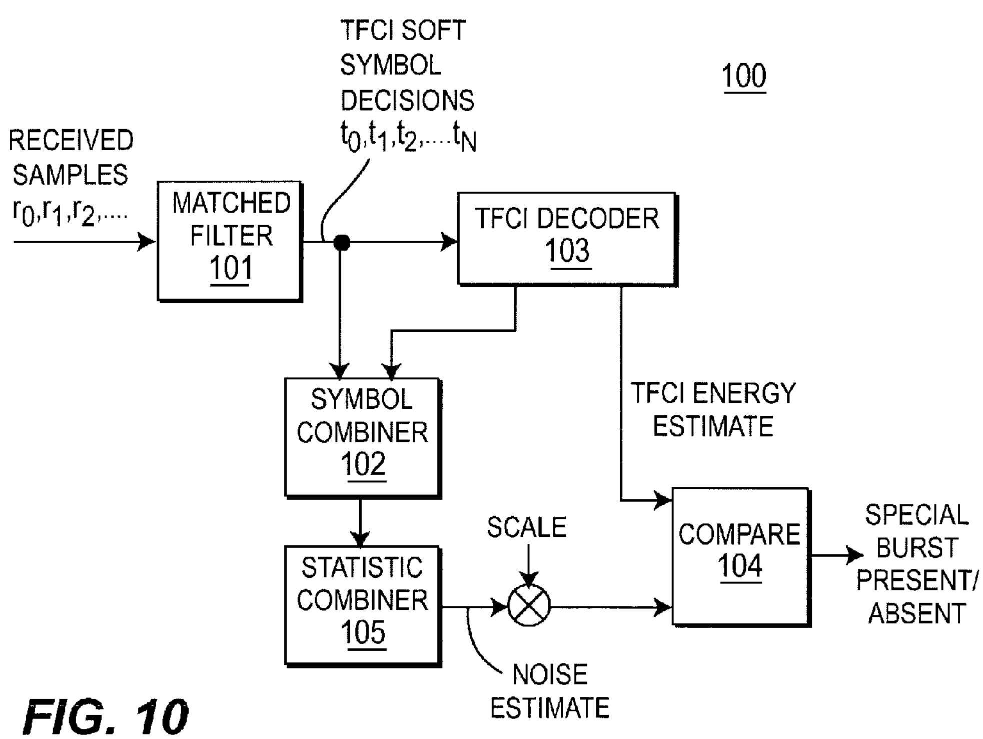
FIG. 10 is a sixth alternative embodiment of the burst detector of the present invention.

A sixth alternative embodiment of the burst detector of the present invention is illustrated in FIG. 10. Again, this alternative burst detector 100 is similar to that which is disclosed in FIG. 6. Similar to the fifth alternative burst detector 60, an alternate method of generating a noise estimate is disclosed. In this alternative, a symbol combiner 102, coupled to the matched filter 101, TFCI decoder 103 and statistic combiner 105, is used to generate the noise estimate. The soft symbols from the matched filter 101 are forwarded to the symbol combiner 102, as well as, the TFCI word generated by the TFCI decoder 103. The symbol combiner 102 generates a set of statistics by combining the soft symbols, excluding from the set a statistic provided by the TFCI decoder 103 representing the decoded TFCI word, and forwards the set to the statistic combiner 105. The statistic combiner 105 combines the statistics from the symbol combiner 102, resulting in a noise estimate. The noise estimate is then scaled and forwarded to the comparator 104 for comparison against the power estimate of the TFCI word from the TFCI decoder 103.

Figure 11:
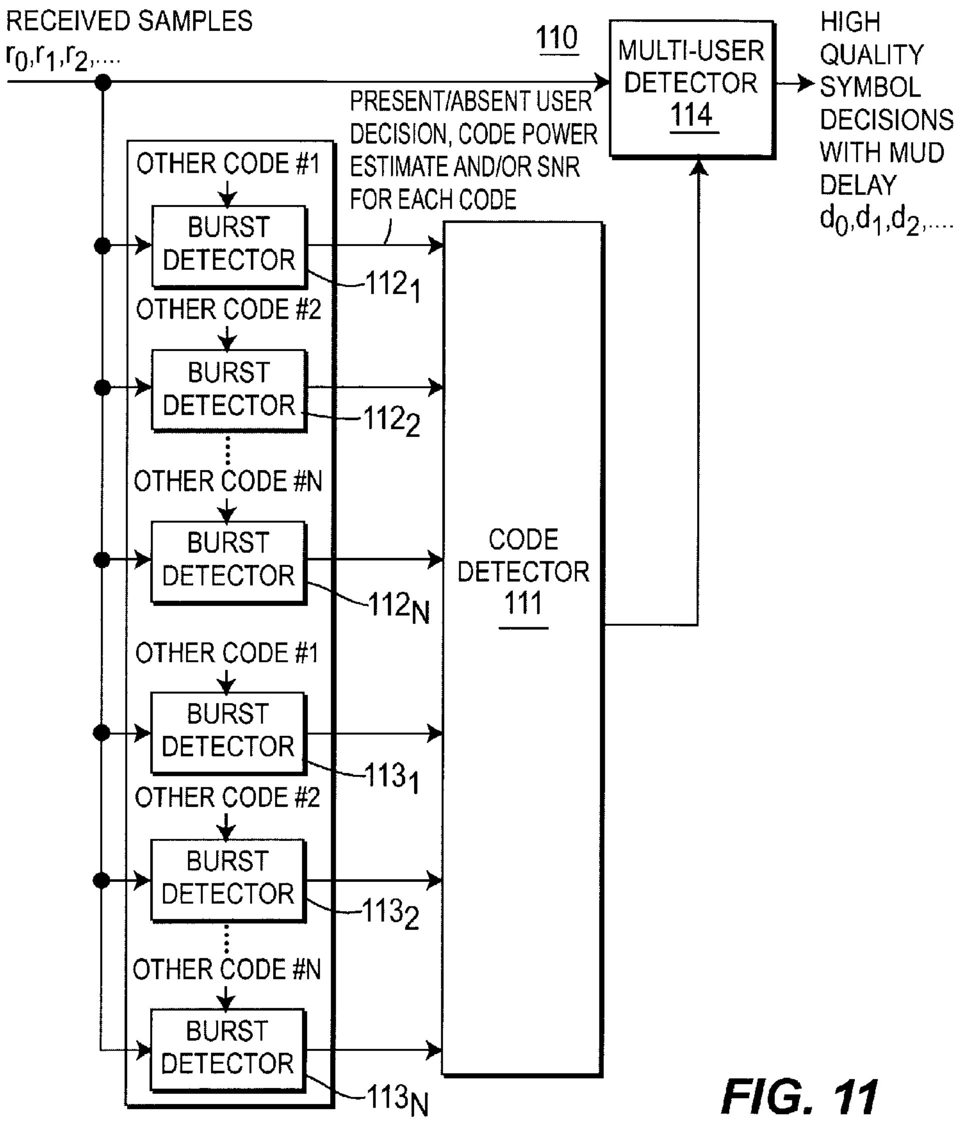
FIG. 11 is a block diagram of an application of the burst detector of the present invention.

FIG. 11 is a block diagram of a receiver 110 comprising a CDD 111 which uses a plurality of burst detectors $\mathbf{112}_1 \ldots \mathbf{112}_n$, $\mathbf{113}_1 \ldots \mathbf{113}_n$ to generate the codes to be forwarded to the MUD 114. Each burst detector $\mathbf{112}_1 \ldots \mathbf{112}_n$, $\mathbf{113}_1, \ldots \mathbf{113}_n$ outputs a signal to the CDD 111 indicating whether the code has been received in the burst. The CDD 111 uses these inputs to provide the MUD 114 with the set of codes associated with the received signal. It should be noted that the burst detector of any of the embodiments of the present invention can be used to detect the presence of codes in general. The burst detector is not limited to only detecting the end of DTX state of a particular CCTrCh.

Figure 12:
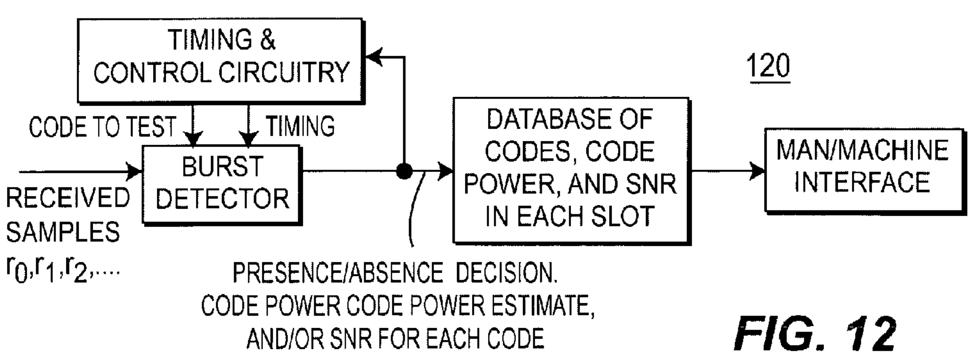
FIG. 12 is a block diagram of an alternate use for the burst detector of the present invention.

FIG. 12 illustrates an alternate use for the burst detector of the present invention. As shown in FIG. 12, the burst detector may be used to monitor power, signal to noise ratio (SNR) and the presence of codes at a receiver that is not intended to have access to the underlying transmitted information. For example, this information can be used for cell monitoring applications. The output of the noise estimator 11 and the signal power estimator 13 are output from the burst detector for each code that is tested. The database maintains a history of the measurements and can compute and store the signal to noise ratio (SNR). This data can then be used to determine which, if any, codes are active in a cell.

The burst detector of the present invention provides a receiver with the ability to monitor the received signal to determine if a particular CCTrCh associated with the UE has reached the end of full DTX state. In particular, this ability is provided before the data estimation, avoiding the need for the data estimation device to process a large number of codes that may not have been transmitted. This results in a reduction in unnecessary power dissipation during full DTX by not operating the MUD (or other data estimation device) on the particular CCTrCh in the full DTX state. In the case where a CCTrCh is allocated physical channels in multiple timeslots in a frame, and the burst detector has indicated that DTX has not ended, the full receiver chain can remain off during the second and subsequent timeslots in a frame saving significantly more power.

The burst detector also results in better performance by eliminating the occurrence of the filling of the MUD with codes that were not transmitted, which reduces the performance of the CCTrChs associated with the UE. To simplify implementation, code detection devices often assume that at least one code has been transmitted and employ relative power tests to select the set of codes to output to the MUD. If no codes are transmitted for CCTrCh, such as during full DTX, a code detection device may erroneously identify codes as having been transmitted leading to poor performance. By determining whether full DTX is continuing and providing the information to the code detection device, the burst detector allows use of simpler code detection algorithms. Multiple burst detectors can be used in parallel (FIG. 11) to provide further input to a code detection device enabling further simplifications therein.

While the present invention has been described in terms of the preferred embodiment, other variations which are within the scope of the invention as outlined in the claims below will be apparent to those skilled in the art.

What is claimed is:

1. A receiver for receiving communication signals in time frames divided into a plurality of timeslots, wherein said timeslots may include data signals for a plurality of channels, including a burst detector for detecting when a selected timeslot is received without selected ones of the plurality of channels, the burst detector comprising:

a noise estimation device for determining a scaled noise power estimate of a signal received in said selected timeslot;

a matched filter for detecting a predetermined code within a signal received in said timeslot;

a signal power estimation device, responsive for said matched filter, for generating a signal power estimate of a detected code;

a comparator, responsive to said noise power estimation and said signal power estimation devices, for generating a burst detection signal when a signal power estimate is greater than a noise power estimate; and a data estimation device for decoding the received signal of said timeslot when the burst detection signal is generated.

2. The receiver of claim 1 wherein said data estimation device comprises:

a code detection device for generating signal codes in response to a burst detection signal;

a decoder for decoding a received signal in response to signal codes received from said code detection device; and a transport format combination index (TFCI) decoder, coupled to said decoder, for detecting a TFCI signal in a decoded received signal; said TFCI signal being representative of the number of selected channels in said selected timeslot.

3. The receiver of claim 2 further comprising a demultiplexer responsive to said data estimation device, for verifying that said selected timeslot includes channel data for each selected channel and generating a monitoring signal when channel data is present.

4. The receiver of claim 3 wherein said burst detector ceases detection of a received signal when a monitoring signal is generated and said TFCI signal indicates that one or more of said selected channels have been received in the timeslot.

5. The receiver of claim 4 wherein said burst detector continues to detect said received signal when said TFCI signal indicates that no selected channels have been received in said timeslot.

6. The receiver of claim 1 wherein said plurality of channels are allocated to one or more coded composite transport channels (CCTrChs) within said selected timeslot; a selected CCTrCh being associated with said receiver.

7. The receiver of claim 6 wherein said data estimation device comprises:

a code detection device for generating signal codes in response to a burst detection signal;

a decoder for decoding a received signal in response to signal codes received from said code detection device; and a transport format combination index (TFCI) decoder, coupled to said decoder, for detecting a TFCI signal in a decoded received signal; said TFCI signal being representative of the number of selected channels allocated to a selected CCTrCh.

8. The receiver of claim 7 further comprising a demultiplexer responsive to said data estimation device, for verifying that said selected CCTrCh includes channel data and generating a monitoring signal when channel data is present.

9. The receiver of claim 3 wherein said burst detector ceases detection of a received signal when a monitoring signal is generated and said TFCI signal indicates that one or more of said selected channels have been received in the CCTrCh.

10. The receiver of claim 4 wherein said burst detector continues to detect said received signal when said TFCI signal indicates that no selected channels have been received in said CCTrCh.

11. The receiver of claim 7 further including a plurality of burst detectors, each associated with at least one of a plurality of selected CCTrChs, for detecting when a selected timeslot is received without selected channels associated with the burst detectors respective CCTrCh.

12. The receiver of claim 1 wherein said burst detector further comprises a preliminary transport format combination index (TFCI) decoder responsive to said matched filter for determining TFCI power estimates for each of a plurality of TFCI words in a received signal;

said noise estimation device using each of said TFCI power estimates to determine said scaled noise power estimate; and said signal power estimation device using a largest of said TFCI power estimates to generate said signal power estimate.

13. The receiver of claim 1 wherein said signal power estimation decoder is a transport format combination index decoder which determines TFCI power estimates for each of a plurality of TFCI words in the received signal; and said power estimate being the largest of said TFCI power estimates.

14. The receiver of claim 1 wherein said signal power estimation device comprises:

a transport format combination index decoder (TFCI) for determining a TFCI power estimate of a selected TFCI word in the received signal;

a decision feed back loop for determining a symbol power estimate of said received signal, comprising:

a demodulator for generating symbol decisions;

a conjugator coupled to said demodulator, for conjugating said symbol decisions; and a symbol power estimator, responsive to said conjugated symbol decisions and said matched filter outputs, for generating a symbol power estimate; and said signal power estimate being the combination of said TFCI power estimate and said symbol power estimate.

15. The receiver of claim 1 wherein said signal power estimation device comprises a decision feed back loop for determining a symbol power estimate of said received signal, comprising:

a demodulator for generating symbol decisions;

a conjugator coupled to said demodulator, for conjugating said symbol decisions; and a symbol power estimator, responsive to said conjugated symbol decisions and said matched filter outputs, for generating a symbol power estimate; and said signal power estimate being the symbol power estimate.

16. The receiver of claim 1 wherein said noise estimation device is a matched filter for detecting a nearly orthogonal code within said received signal, said magnitude of said detected orthogonal code being the noise power estimate;

said signal power estimation device being a transport format combination index decoder for determining a TFCI power estimate of a selected TFCI word in the received signal; and said TFCI power estimate being said signal power estimate.

17. A method for monitoring communication signals in time frames divided into a plurality of timeslots, wherein said timeslots may include data signals for a plurality of channels, and detecting when a selected timeslot is received without selected ones of the plurality of channels, the method comprising the steps of:

determining a scaled noise power estimate of any signal received in said selected timeslot;

detecting a predetermined code within the signal received in said timeslot;

generating a signal power estimate of the detected code;

generating a burst detection signal when said signal power estimate is greater than the noise power estimate; and decoding the received signal of said timeslot when the burst detection signal is generated.

18. The method of claim 17 further comprising the steps of:

generating signal codes in responses to said burst detection signal, said decoding of the received signal responsive to said signal codes;

detecting a transport format combination index (TFCI) signal in said decoded received signal representing the number of selected channels in said selected timeslot;

verifying that said selected timeslot includes channel data; and generating a monitoring signal when channel data is present in said selected timeslot.

19. The method of claim 18 wherein said monitoring of said received signal ceases in response to said monitoring signal and TFCI indicates that one or more of said selected channels have been received in the timeslot.

20. The method of claim 19 wherein said monitoring of said received signal continues when said TFCI signal indicates that no selected channels have been received in said timeslot.

21. The method of claim 17 wherein said plurality of channels are allocated to one or more selected coded composite transport channels (CCTrCh) within said selected timeslot.

22. The method of claim 21 further comprising the steps of:

generating signal codes in responses to said burst detection signal, said decoding of the received signal response to said signal codes;

detecting a transport format combination index (TFCI) signal in said decoded received signal representing the number of selected channels in said selected CCTrCh;

verifying that said selected CCTrCh includes channel data; and generating a monitoring signal when channel data is present in said selected CCTrCh.

23. The method of claim 22 wherein said monitoring of said received signal ceases in response to said monitoring signal and TFCI indicates that one or more of said selected channels have been received in the CCTrCh.

24. The method of claim 23 wherein said monitoring of said received signal continues when said TFCI signal indicates that no selected channels have been received in said selected CCTrCh.

25. The method of claim 17 wherein said generation of said signal power estimate comprises the steps of determining a largest TFCI power estimate out of a plurality of TFCI power estimates for a plurality of TFCI words in said received signal, said largest TFCI power estimate being said signal power estimate;

said determination of the scaled noise power uses the plurality of TFCI power estimates, said largest TFCI power estimate being excluded, to generate said noise power estimate.

26. The method of claim 17 wherein said generation of said signal power estimate comprises the steps of determining a largest TFCI power estimate out of a plurality of TFCI power estimates for a plurality of TFCI words in said received signal, said largest TFCI power estimate being said signal power estimate.

27. The method of claim 17 wherein said generation of said signal power estimate comprises the steps of:

determining a transport format combination index (TFCI) power estimate of a selected TFCI word in the received signal;

determining a symbol power estimate of said received signal; and combining said TFCI power estimate with said symbol power estimate to generate said signal power estimate.

28. The method of claim 17 wherein said generation of said signal power estimate comprises the steps of:

generating symbol decisions;

conjugating said symbol decisions; and combining said conjugated symbol decisions and said predetermined code to generate said signal power estimate.

29. The method of claim 17 wherein said determination of said scaled noise power comprises the step of detecting a nearly orthogonal code within said received signal, said nearly orthogonal code magnitude being the noise estimate;

said generation of said signal power estimate comprises the steps of determining a largest TFCI power estimate out of a plurality of TFCI power estimates for a plurality of TFCI words in said received signal, said largest TFCI power estimate being said signal power estimate.

* * * * *

UNITED STATES PATENT AND TRADEMARK OFFICE

CERTIFICATE OF CORRECTION

PATENT NO. : 7,180,881 B2
APPLICATION NO. : 10/196857
DATED : February 20, 2007
INVENTOR(S) : Robert DiFazio It is certified that error appears in the above-identified patent and that said Letters Patent is hereby corrected as shown below:

ON THE TITLE PAGE

Item (56), page 1, OTHER PUBLICATIONS, right column, line 1, before the word "Preamble", delete "Detectionof" and insert therefor --Detection of--.

Item (57), ABSTRACT, page 1, right column, line 11, before the word "selected", delete ",".

Item (57), ABSTRACT, page 1, right column, line 12, after the word "estimate", insert --,--.

IN THE DRAWINGS

At sheet 9, FIG 12, at note at bottom, line 2, delete first instance of "CODE POWER".

At column 4, line 43, after the word "results", delete "is".

At claim 11, column 10, line 54, before the words "respective", delete "detectors" and insert therefor --detectors'--.

At claim 18, column 11, line 60, before the words "to said", delete "responses" and insert therefor --response--.

At claim 22, column 12, line 17, before the words "to said", delete "responses" and insert therefor --response--.

Signed and Sealed this

Twentieth Day of November, 2007

JON W. DUDAS
*Director of the United States Patent and Trademark Office*